United States Patent
Wada et al.

(10) Patent No.: US 9,538,112 B2
(45) Date of Patent: Jan. 3, 2017

(54) SOLID-STATE IMAGE SENSOR AND CAMERA WITH CHARGE-VOLTAGE CONVERTER

(71) Applicant: CANON KABUSHIKI KAISHA, Tokyo (JP)

(72) Inventors: Yoichi Wada, Yokohama (JP); Masahiro Kobayashi, Tokyo (JP); Fumihiro Inui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 14/600,217

(22) Filed: Jan. 20, 2015

(65) Prior Publication Data

US 2015/0222836 A1    Aug. 6, 2015

(30) Foreign Application Priority Data

Feb. 4, 2014   (JP) ................................. 2014-019770

(51) Int. Cl.
*H04N 5/378*    (2011.01)
*H04N 5/355*    (2011.01)

(52) U.S. Cl.
CPC ............ *H04N 5/378* (2013.01); *H04N 5/3559* (2013.01)

(58) Field of Classification Search
CPC .............................. H04N 5/3559; H04N 5/378
See application file for complete search history.

(56) References Cited

U.S. PATENT DOCUMENTS 6,320,616 B1 *  11/2001  Sauer ................... H04N 5/3575
                                                          250/208.1
6,778,213 B1 *  8/2004   Nakashiba ........ H01L 27/14603
                                                          257/E27.131

(Continued)

FOREIGN PATENT DOCUMENTS

| JP | 2012-010106 A | 1/2012 |
| JP | 2012-147169 A | 8/2012 |
| JP | 2013-033896 A | 2/2013 |

OTHER PUBLICATIONS

Fumihiro Inui, U.S. Appl. No. 14/456,063, filed Aug. 11, 2014, 2664.

(Continued)

*Primary Examiner* — Amy Hsu
(74) *Attorney, Agent, or Firm* — Fitzpatrick, Cella, Harper & Scinto

(57) ABSTRACT

An image sensor including a photoelectric converter, a charge-voltage converter, a transfer transistor to transfer a charge from the photoelectric converter to the charge-voltage converter whereby potential of the charge-voltage converter changes to a first direction, an amplifier transistor to output a signal corresponding to potential of the charge-voltage converter to a column signal line, the amplifier transistor sequentially outputting, to the column signal line, noise level and light signal level, a capacitance between a control signal line and the charge-voltage converter, and a control unit to change a potential of the control signal line so that the potential of the charge-voltage converter changes to a second direction opposite to the first direction in a period in which the charge-voltage converter is in floating and which is prior to outputting the noise level.

19 Claims, 6 Drawing Sheets

(56) References Cited

U.S. PATENT DOCUMENTS

| | | | |
|---|---|---|---|
| 6,975,356 B1 * | 12/2005 | Miyamoto | H04N 5/3575 348/300 |
| 7,227,208 B2 | 6/2007 | Ogura et al. | |
| 7,462,810 B2 | 12/2008 | Kobayashi et al. | |
| 7,561,199 B2 | 7/2009 | Noda et al. | |
| 7,719,587 B2 | 5/2010 | Ogura et al. | |
| 7,928,477 B2 | 4/2011 | Kobayashi et al. | |
| 7,935,995 B2 | 5/2011 | Watanabe et al. | |
| 8,045,034 B2 | 10/2011 | Shibata et al. | |
| 8,063,351 B2 | 11/2011 | Kobayashi et al. | |
| 8,174,604 B2 | 5/2012 | Shibata et al. | |
| 8,222,682 B2 | 7/2012 | Watanabe et al. | |
| 8,259,205 B2 | 9/2012 | Noda et al. | |
| 8,259,206 B1 | 9/2012 | Shibata et al. | |
| 8,289,432 B2 | 10/2012 | Shibata et al. | |
| 8,357,956 B2 | 1/2013 | Kobayashi et al. | |
| 8,456,559 B2 | 6/2013 | Yamashita et al. | |
| 8,552,353 B2 | 10/2013 | Kobayashi et al. | |
| 8,723,232 B2 | 5/2014 | Kobayashi et al. | |
| 8,817,151 B2 | 8/2014 | Minowa et al. | |
| 8,884,391 B2 | 11/2014 | Fudaba et al. | |
| 8,885,082 B2 | 11/2014 | Noda et al. | |
| 8,952,433 B2 | 2/2015 | Inui | |
| 2007/0023786 A1 * | 2/2007 | Johnson | H01L 27/14609 257/222 |
| 2007/0152292 A1 * | 7/2007 | Toros | H01L 27/14603 257/463 |
| 2011/0050965 A1 * | 3/2011 | Uzumaki | H04N 5/2256 348/241 |
| 2011/0228149 A1 * | 9/2011 | Naruse | H01L 27/14627 348/273 |
| 2013/0001403 A1 | 1/2013 | Yamakawa | |
| 2013/0141619 A1 * | 6/2013 | Lim | H01L 27/14609 348/302 |
| 2013/0182163 A1 | 7/2013 | Kobayashi et al. | |
| 2013/0187210 A1 | 7/2013 | Kobayashi et al. | |
| 2013/0222631 A1 * | 8/2013 | Iwane | H04N 5/3658 348/222.1 |
| 2014/0043511 A1 * | 2/2014 | Iwata | H04N 5/3698 348/308 |
| 2014/0061436 A1 | 3/2014 | Kobayashi | |
| 2014/0300786 A1 | 10/2014 | Okita et al. | |

OTHER PUBLICATIONS

Mineo Shimotsusa, et al., U.S. Appl. No. 14/628,828, filed Feb. 23, 2015, 2673.

Masahiro Kobayashi, et al., U.S. Appl. No. 14/640,526, filed Mar. 6, 2015, 2811.

Daisuke Yoshida, et al., U.S. Appl. No. 14/662,604, filed Mar. 19, 2015, 2872.

* cited by examiner

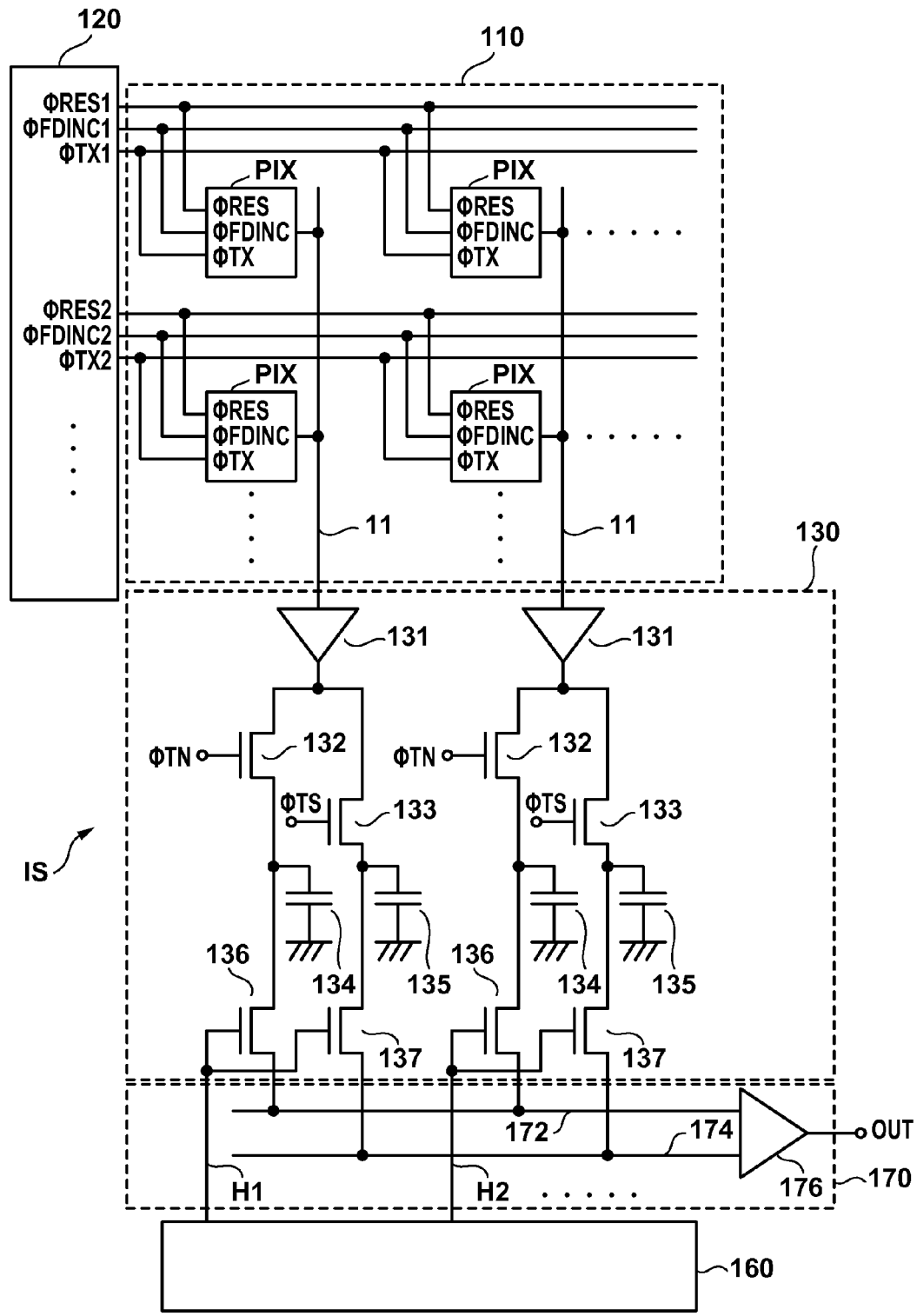
F I G. 1

F I G. 4
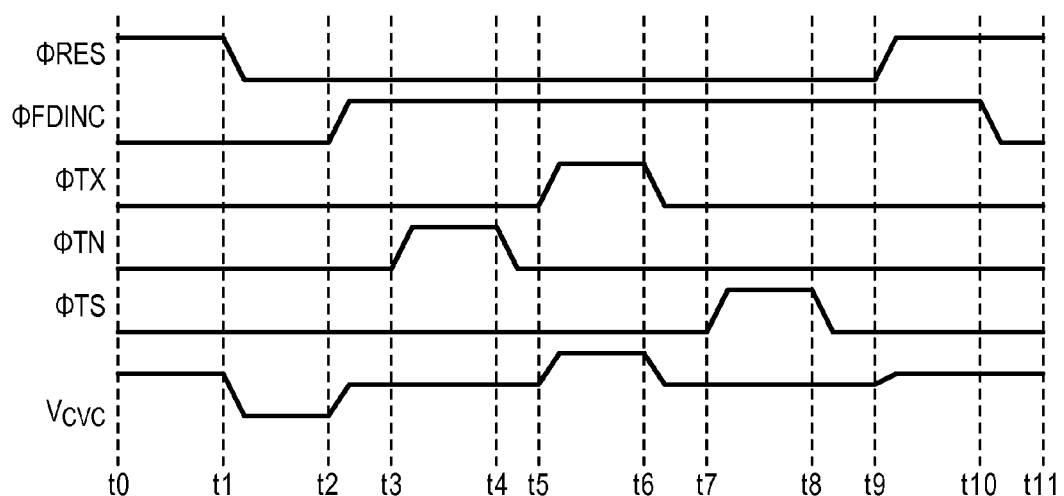

SOLID-STATE IMAGE SENSOR AND CAMERA WITH CHARGE-VOLTAGE CONVERTER

BACKGROUND OF THE INVENTION

Field of the Invention

The present invention relates to a solid-state image sensor and a camera.

Description of the Related Art

A solid-state image sensor including a plurality of two-dimensionally arrayed photoelectric converters is mounted in a digital camera, a digital camcorder, or the like. In the solid-state image sensor, a transfer transistor transfers charges accumulated in the photoelectric converters to a floating diffusion (to be referred to as an FD hereinafter). The FD functions as a charge-voltage converter which converts a charge quantity into a voltage. The gate of an amplifier transistor is connected to the FD. The amplifier transistor outputs, to a column signal line, a signal corresponding to the charge quantity (the potential of the FD) transferred to the FD. The charge quantity that can be transferred to the FD depends on the potential of the FD. Japanese Patent Laid-Open No. 2012-010106 describes that when the FD is in a floating state, the potential of the FD is increased by increasing the potential of the gate of a reset transistor within a range where the reset transistor is not turned on. Increasing the potential of the FD makes it possible to increase the charge quantity that can be transferred to the FD and widen a dynamic range. Note that if the potential of the gate of the reset transistor is increased until the reset transistor is turned on, the reset transistor drives the FD at a predetermined potential. In this state, therefore, it is impossible to read out signals corresponding to the charges of the photoelectric converters even if the charges are transferred to the FD.

As described above, the solid-state image sensor described in Japanese Patent Laid-Open No. 2012-010106 can increase the potential of the gate of the reset transistor only within the range where the reset transistor is not turned on. Therefore, the charge quantity that can be transferred to the FD serving as the charge-voltage converter is limited to be in the range where the reset transistor is not turned on.

SUMMARY OF THE INVENTION

The present invention provides a solid-state image sensor having an arrangement advantageous in increasing a charge quantity that can be transferred to a charge-voltage converter and widening a dynamic range.

One of the aspects of the present invention provides a solid-state image sensor comprising: a photoelectric converter; a charge-voltage converter; a transfer transistor configured to transfer a charge generated in the photoelectric converter to the charge-voltage converter, wherein a potential of the charge-voltage converter changes to a first direction by a transferred charge; an amplifier transistor configured to output a signal corresponding to the potential of the charge-voltage converter to a column signal line, the amplifier transistor being configured to sequentially output, to the column signal line, a noise level before the transfer transistor transfers the charge to the charge-voltage converter and a light signal level after the transfer transistor transfers the charge to the charge-voltage converter; a capacitance between a control signal line and the charge-voltage converter; and a control unit configured to change a potential of the control signal line so that the potential of the charge-voltage converter changes to a second direction which is opposite to the first direction in a period in which the charge-voltage converter is in a floating state and which is prior to outputting the noise level to the column signal line.

Further features of the present invention will become apparent from the following description of exemplary embodiments with reference to the attached drawings.

BRIEF DESCRIPTION OF THE DRAWINGS

FIG. 1 is a view showing the circuit arrangement of a solid-state image sensor according to the first embodiment of the present invention;

FIG. 4 is a timing chart showing the operation of the solid-state image sensor according to the first embodiment of the present invention;

DESCRIPTION OF THE EMBODIMENTS

Embodiments of the present invention will exemplarily be described below with reference to the accompanying drawings.

The circuit arrangement of a solid-state image sensor IS according to the first embodiment of the present invention will be described with reference to FIG. 1. The solid-state image sensor IS includes a pixel array 110 in which a plurality of pixels PIX are arrayed to form a plurality of rows and a plurality of columns, and a readout unit 130 which reads out the signal of each pixel PIX from the pixel array 110. The solid-state image sensor IS also includes a row selection unit (control unit) 120 which selects a read target row in the pixel array 110, a column selection unit 160 which selects the signals read out by the readout unit 130, and an output unit 170 which outputs the signals selected by the column selection unit 160.

The row selection unit (control unit) 120 outputs a reset signal φRES, an extension signal φFDINC, and a transfer signal φTX. The reset signal φRES supplied to the ith row is denoted as φRESi (for example, φRES1 or φRES2). Similarly, the extension signal φFDINC supplied to the ith row is denoted as φFDINCi (for example, φFDINC1 or φFDINC2). Similarly, the transfer signal φTX supplied to the ith row is denoted as φTXi (for example, φTX1 or φTX2).

Figure 2:
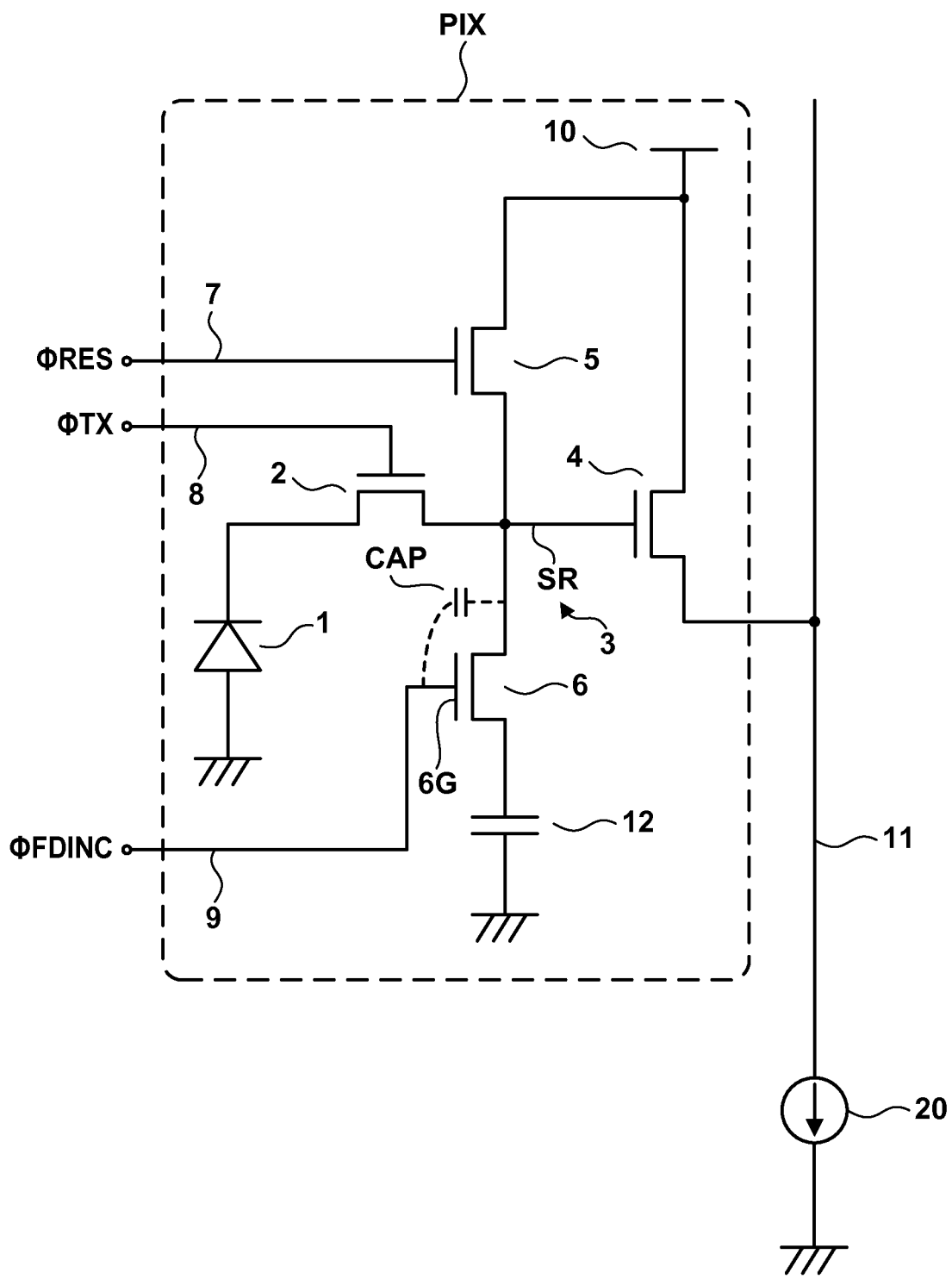
FIG. 2 is a view showing the arrangement of a pixel in the solid-state image sensor according to the first embodiment of the present invention.

FIG. 2 illustrates the arrangement of one pixel PIX. In an example shown in FIG. 2, the pixel PIX outputs a signal corresponding to a quantity of electrons, out of electrons (negative charges) and holes (positive charges) generated by photoelectric conversion, to a column signal line 11. The pixel PIX includes a photoelectric converter 1, a charge-voltage converter 3, a transfer transistor 2, a reset transistor 5, and an amplifier transistor 4. The photoelectric converter 1 can be formed by, for example, a photodiode. The photoelectric converter 1 includes a charge accumulation portion.

In the example shown in FIG. 2, the photoelectric converter 1 converts incident light into the electrons (negative charges) and the holes (positive charges), and out of these accumulates the electrons (negative charges) in the charge accumulation portion. The charge-voltage converter 3 includes a semiconductor region SR serving as a floating diffusion (FD). The charge-voltage converter 3 functions as a capacitance which converts a charge quantity into a voltage (potential). The transfer transistor 2 transfers the charges accumulated in the charge accumulation portion of the photoelectric converter 1 to the charge-voltage converter 3 when the transfer signal ϕTX supplied to a gate via a transfer signal line 8 is set at an active level (for example, high level).

If the transfer transistor 2 transfers the charges of the photoelectric converter 1 to the charge-voltage converter 3, the potential of the charge-voltage converter 3 changes to a certain direction. This direction is defined as the first direction. As illustrated in FIG. 2, if the pixel PIX is configured to output the signal corresponding to the quantity of the electrons (negative charges) generated by photoelectric conversion to the column signal line 11, the transfer transistor 2 transfers the electrons (negative charges) of the photoelectric converter 1 to the charge-voltage converter 3. Therefore, the potential of the charge-voltage converter 3 decreases by this transfer. That is, in this case, the first direction is a direction in which the potential decreases. On the other hand, if the pixel PIX is configured to output a signal corresponding to the quantity of the holes (positive charges) generated by photoelectric conversion to the column signal line 11, the transfer transistor 2 transfers the holes (positive charges) of the photoelectric converter 1 to the charge-voltage converter 3. Therefore, the potential of the charge-voltage converter 3 increases by this transfer. That is, in this case, the first direction is a direction in which the potential increases.

The reset transistor 5 is arranged to be able to form a current path between a potential 10 and the charge-voltage converter 3. The reset transistor 5 resets the potential of the charge-voltage converter 3 to a potential corresponding to the potential 10 when the reset signal ϕRES supplied to the gate via a reset signal line 7 is set at the active level (for example, high level). The amplifier transistor 4 forms a source follower amplifier together with a current source 20 connected to the column signal line 11, and outputs a signal corresponding to the potential of the charge-voltage converter 3 to the column signal line 11.

The pixel PIX further includes a capacitance CAP arranged between the charge-voltage converter 3 and a control signal line 9 to which the extension signal ϕFDINC is applied. In this example, the capacitance CAP includes a capacitance between a gate 6G and the drain of a transistor 6 whose drain is connected to the charge-voltage converter 3. In other words, in this example, the capacitance CAP includes a capacitance component between the gate 6G serving as an electrode electrically connected to the control signal line 9 and the semiconductor region SR which forms the charge-voltage converter 3. The pixel PIX can include an additional capacitance 12 arranged between the source of the transistor 6 and a reference potential (for example, a ground potential).

If the potential of the control signal line 9, that is, the level of the extension signal ϕFDINC increases, the potential of the charge-voltage converter 3 also increases by capacitive coupling between the gate 6G and the charge-voltage converter 3 by the capacitance CAP. That is, if the level of the extension signal ϕFDINC increases, the potential of the charge-voltage converter 3 changes to the second direction (here, the direction in which the potential increases) which is opposite to the first direction (here, the direction in which the potential decreases) by capacitive coupling between the gate 6G and the charge-voltage converter 3 caused by the capacitance CAP.

The row selection unit (control unit) 120 changes (increases) the potential of the control signal line 9 to change the direction of the potential of the charge-voltage converter 3 to the second direction (here, the direction in which the potential increases) in a period of a state in which the reset transistor 5 is turned off after the potential of the charge-voltage converter 3 is reset by turning on the reset transistor 5 (to be referred to as a state in which a reset sequence is completed hereinafter), that is, a state in which the charge-voltage converter 3 is in a floating state. This sets the charge-voltage converter 3 in a state in which it can receive more electrons (negative charges), that is, a state in which a saturated charge quantity has increased. Therefore, a dynamic range is expanded.

Further, in this example, the additional capacitance 12 is included, and the transistor 6 is arranged to be able to form a current path between the charge-voltage converter 3 and the additional capacitance 12. A capacitance value ($C_{ADD}$) of the additional capacitance 12 is added to a capacitance value ($C_{CVC}$) of the charge-voltage converter 3 by turning on the transistor 6 to form the current path between the charge-voltage converter 3 and the additional capacitance 12. This sets the charge-voltage converter 3 in the state in which it can receive more electrons (negative charges), that is, the state in which the saturated charge quantity has increased. Therefore, the dynamic range is expanded.

That is, it is possible to increase the saturated charge quantity by increasing the potential of the control signal line 9 (the level of the control signal ϕFDINC) in the period in which the charge-voltage converter 3 is in the floating state, and transiting the transistor 6 from off to on. An increase quantity ΔQ of the saturated charge quantity is given by:

$$\Delta Q = (C_{CVC} + C_{ADD}) \cdot \Delta V + C_{ADD} \cdot V$$

wherein ΔV is the quantity of a change in the potential of the charge-voltage converter 3 caused by capacitive coupling by the capacitance CAP, and V is the potential change quantity of the charge-voltage converter 3 corresponding to the saturated charge quantity without the capacitance CAP and the additional capacitance 12.

The increase quantity ΔQ of the saturated charge quantity when no additional capacitance 12 is provided, that is, when there is only the potential change of the charge-voltage converter 3 caused by capacitive coupling by the capacitance CAP is given by:

$$\Delta Q = C_{CVC} \cdot \Delta V$$

Figure 3A:
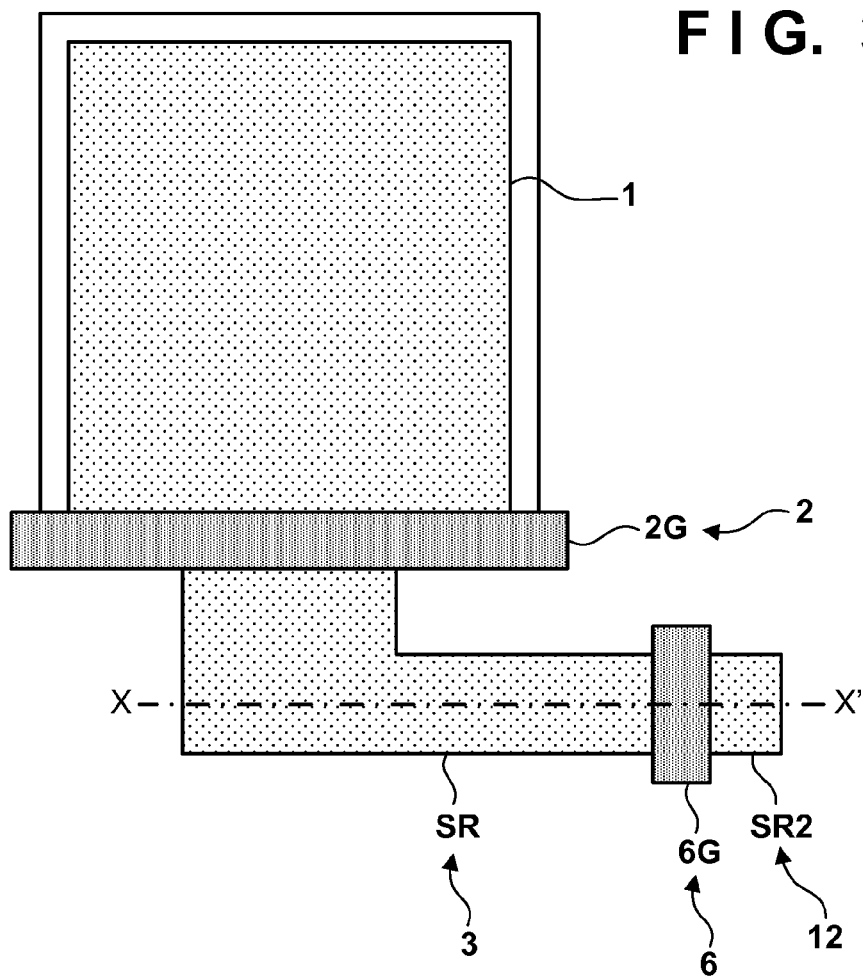
FIGS. 3A and 3B are a layout view and a sectional view respectively showing the arrangement of a part of the pixel of the solid-state image sensor according to the first embodiment of the present invention.
Figure 3B:
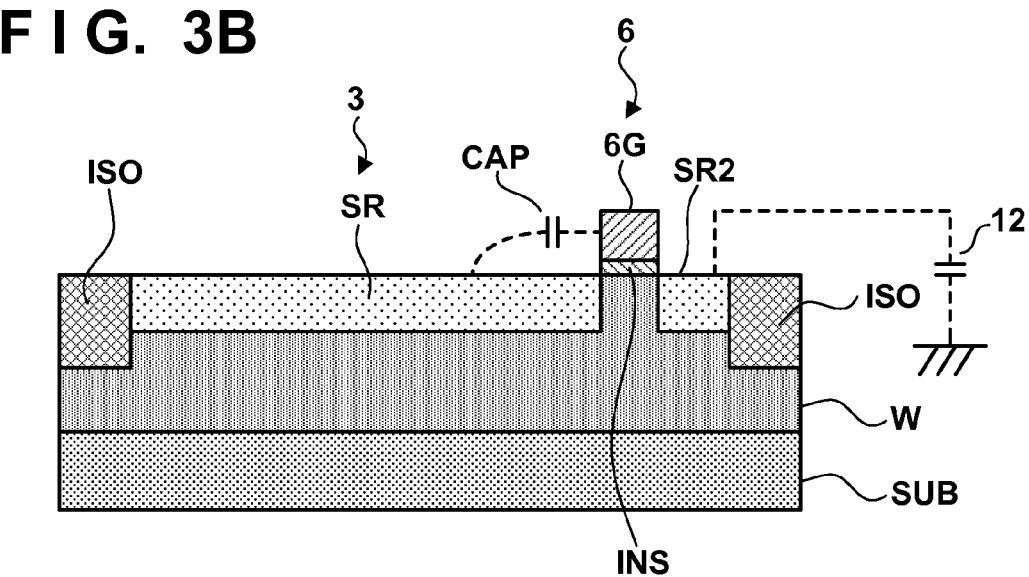

FIGS. 3A and 3B show an example of the arrangement of the capacitance CAP and the additional capacitance 12. FIG. 3A is a schematic layout view, and FIG. 3B is a schematic sectional view taken along an X-X' line. The capacitance CAP includes a capacitance component between the gate 6G serving as the electrode electrically connected to the control signal line 9 and the semiconductor region SR which forms the charge-voltage converter 3. At least a part of the charge-voltage converter 3 is arranged in a semiconductor substrate SUB, for example, in a well W formed on the semiconductor substrate SUB. The charge-voltage converter 3 may include a capacitance provided by a structure arranged on the semiconductor substrate SUB. The gate 6G is arranged on an insulating layer (gate insulating layer) INS on the well W on the semiconductor substrate SUB.

The drain of the transistor 6 can be formed by the semiconductor region SR of the charge-voltage converter 3. That is, the drain of the transistor 6 and the charge-voltage converter 3 can share the semiconductor region SR. The source of the transistor 6 is formed by a second semiconductor region SR2 formed in the semiconductor substrate SUB, for example, in the well W formed on the semiconductor substrate SUB. The semiconductor region SR and the second semiconductor region SR2 have the same conductivity type. On the other hand, the well W has a different conductivity type from that of the semiconductor region SR and the second semiconductor region SR2. A part of the boundary between the semiconductor region SR and the second semiconductor region SR2 can be defined by an element isolation ISO such as an STI or an LOCOS.

The capacitance CAP can be understood as a parasitic capacitance between the gate 6G and the drain (semiconductor region SR) of the transistor 6. The additional capacitance 12 can include the parasitic capacitance of the second semiconductor region SR2. In the example shown in FIGS. 3A and 3B, the transistor 6 has the structure of a MOS transistor, and the gate 6G is arranged on the insulating layer INS on the region between the semiconductor region SR serving as the drain and the second semiconductor region SR2 serving as the source.

Referring back to FIG. 1, the operations of the readout unit 130, the column selection unit 160, and the output unit 170 will be described. The readout unit 130 includes, for each column in the pixel array 110, a column amplifier 131, write switches 132 and 133, signal holding units 134 and 135, and readout switches 136 and 137. Each column amplifier 131 amplifies a noise level and a light signal level output to the column signal line 11. Note that the noise level and the light signal level are output to the column signal line 11 in different periods. The noise level amplified by the column amplifier 131 is written in the signal holding unit 134 via the write switch 132 which is turned on in accordance with a write signal φTN generated by a driving unit (not shown). The light signal level amplified by the column amplifier 131 is written in the signal holding unit 135 via the write switch 133 which is turned on in accordance with a write signal φTS generated by the driving unit (not shown).

The output unit 170 includes horizontal signal lines 172 and 174, and an output amplifier 176. After the noise level is written in the signal holding unit 134 and the light signal level is written in the signal holding unit 135, the column selection unit 160 activates column selection signals H1, H2, . . . in a predetermined order. Then, the noise level written in the signal holding unit 134 and the light signal level written in the signal holding unit 135 are output to the horizontal signal lines 172 and 174 via the readout switches 136 and 137 which have been selected by the activated column selection signals. The output amplifier 176 amplifies the difference between the noise level and the light signal level output to the horizontal signal lines 172 and 174, and outputs it to an output terminal OUT.

FIG. 4 shows the operation of the solid-state image sensor IS, in particular, a method of driving each pixel PIX in one row. At time T=t0, the reset signal φRES is at high level, and a potential $V_{CVC}$ of the charge-voltage converter 3 is reset to a potential (reset level) corresponding to the potential 10. At time T=t1, the reset signal φRES is driven from high level to low level. This reduces the potential $V_{CVC}$ of the charge-voltage converter 3 from the reset level by capacitive coupling between the charge-voltage converter 3 and the gate of the reset transistor 5. Also, the charge-voltage converter 3 is set in the floating state.

At time T=t2, the extension signal φFDINC is driven from low level to high level. This increases the potential $V_{CVC}$ of the charge-voltage converter 3 by capacitive coupling by the capacitance CAP between the charge-voltage converter 3 and the gate 6G of the transistor 6. Furthermore, the transistor 6 is turned on, and the current path is formed between the charge-voltage converter 3 and the additional capacitance 12. That is, by driving the extension signal φFDINC from low level to high level at time T=t2, the saturated charge quantity increases and the dynamic range is widened.

At time T=t3, the write signal φTN is driven from low level to high level. Then, at time T=t4, the write signal φTN is driven from high level to low level. The noise level is written in the signal holding unit 134 in a period in which the write signal φTN is at high level. This noise level is a level at which a level according to the potential $V_{CVC}$ of the charge-voltage converter 3 in the period in which the write signal φTN is at high level is read out via the amplifier transistor 4, the column signal line 11, and the column amplifier 131.

At time T=t5, the transfer signal φTX is driven from low level to high level. Then, at time T=t6, the transfer signal φTX is driven from high level to low level. This increases the potential $V_{CVC}$ of the charge-voltage converter 3 by capacitive coupling between the gate of the transfer transistor 2 and the charge-voltage converter 3. The transfer transistor 2 transfers the charges accumulated in the charge accumulation portion of the photoelectric converter 1 to the charge-voltage converter 3, and the potential $V_{CVC}$ of the charge-voltage converter 3 increases (the direction changes to the first direction). The amplifier transistor 4 outputs a signal (light signal level) corresponding to the potential $V_{CVC}$ of the charge-voltage converter 3 to the column signal line 11.

At time T=t7, the write signal φTS is driven from low level to high level. Then, at time T=t8, the write signal φTS is driven from high level to low level. The light signal level is written in the signal holding unit 135 in a period in which the write signal φTS is at high level. This light signal level is a level at which a level corresponding to the potential $V_{CVC}$ of the charge-voltage converter 3 in the period in which the write signal φTS is at high level is read out via the amplifier transistor 4, the column signal line 11, and the column amplifier 131.

At time T=t9, the reset signal φRES is driven from low level to high level. This resets the potential $V_{CVC}$ of the charge-voltage converter 3, and the potentials of an FD 3 and the additional capacitance 12 to a level corresponding to the potential 10. At time T=t10, the extension signal φFDINC is driven from high level to low level. This turns off the transistor 6, blocks the current path between the charge-voltage converter 3 and the additional capacitance 12, and sets the additional capacitance 12 in the floating state at a node on the side of the transistor 6. In at least a part of a period in which the reset transistor 5 resets the potential of the charge-voltage converter 3, the extension signal φFDINC is kept at or driven to high level by the row selection unit (control unit) 120, thereby resetting the additional capacitance 12.

Figure 5:
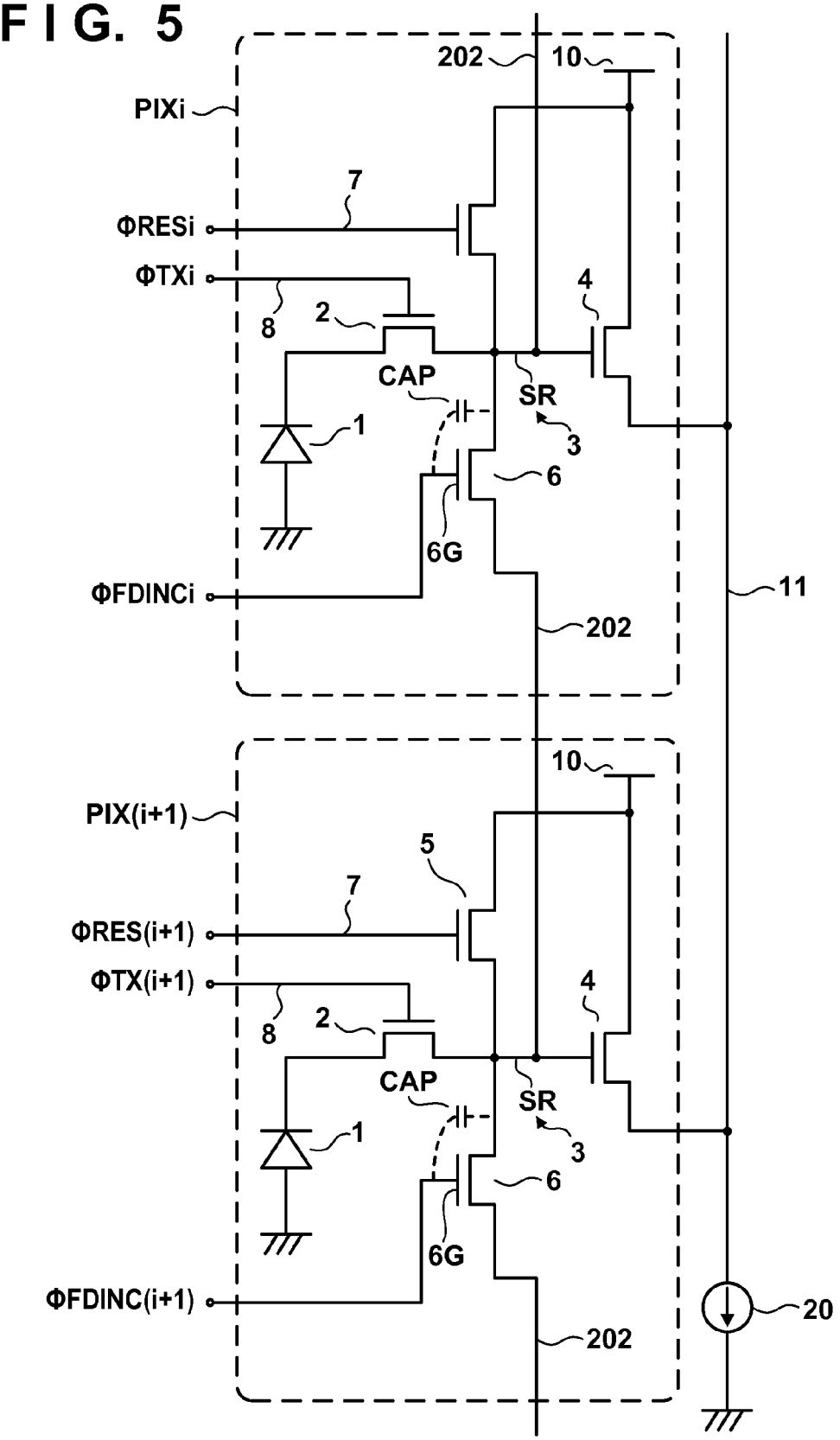
FIG. 5 is a view showing the circuit arrangement of a pixel according to the second embodiment of the present invention.

The second embodiment of the present invention will be described with reference to FIG. 5. Note that points not mentioned in the second embodiment can comply with the first embodiment. FIG. 5 shows the arrangement of each pixel PIX in a solid-state image sensor IS according to the second embodiment of the present invention. In the second embodiment, the capacitance of a charge-voltage converter 3 of a pixel in a row (typically, a next row) different from a row where a pixel from which a signal is to be read out belongs is used instead of the additional capacitance 12 in the first embodiment. FIG. 5 shows the ith row and the (i+1)th row as the rows different from each other. The charge-voltage converter 3 of a pixel PIXi in the ith row and the charge-voltage converter 3 of a pixel PIX(i+1) in the (i+1)th row are connected to each other by turning on a transistor 6 of the pixel PIXi in the ith row. That is, the capacitance of the charge-voltage converter 3 of the pixel PIX(i+1) in the (i+1)th row is used as an additional capacitance when reading out a signal from the pixel PIXi in the ith row.

Figure 6A:
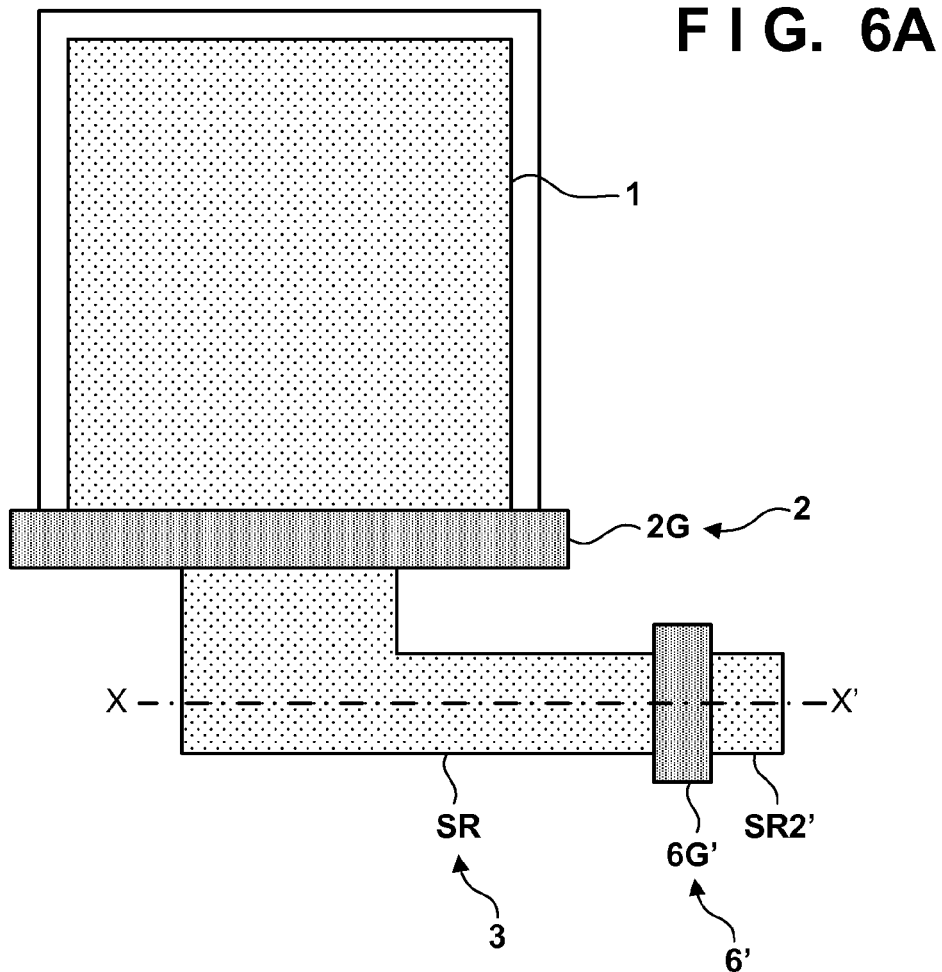
FIGS. 6A and 6B are a layout view and a sectional view respectively showing the arrangement of a part of a pixel of a solid-state image sensor according to the third embodiment of the present invention.
Figure 6B:
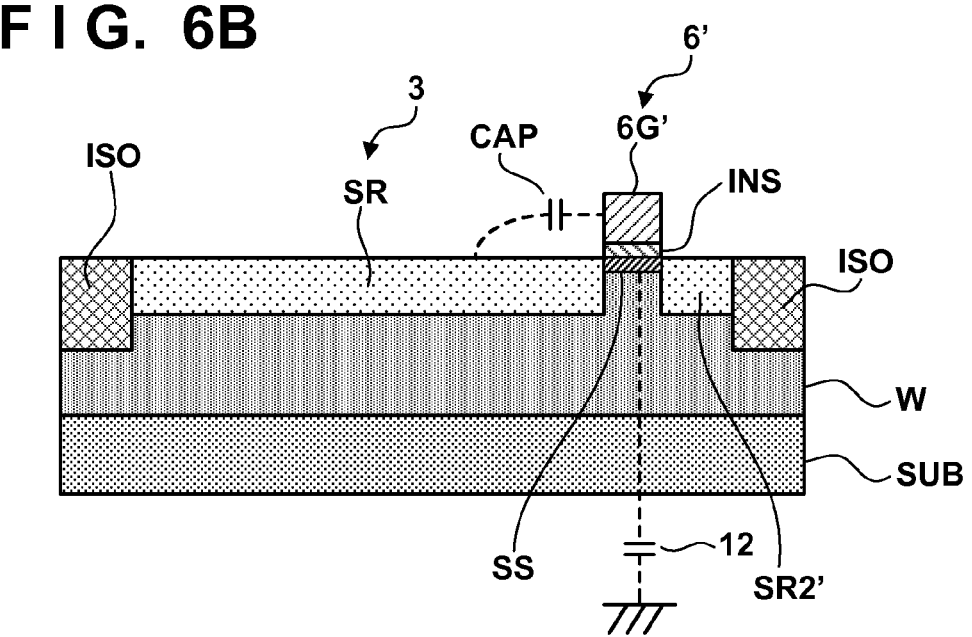

The third embodiment of the present invention will be described with reference to FIGS. 6A and 6B. Note that points not mentioned in the third embodiment can comply with the first or the second embodiment. In the third embodiment, the second semiconductor region SR2 in the first or the second embodiment is changed into a second semiconductor region SR2' having a different conductivity type from that of a semiconductor region SR (the same conductivity type as that of a well W). In the first or the second embodiment, the MOS transistor can be formed by the semiconductor region SR, the second semiconductor region SR2, and the gate 6G. In the third embodiment, however, since the semiconductor region SR and the second semiconductor region SR2' have the conductivity types different from each other, the semiconductor region SR, the second semiconductor region SR2', and an electrode 6G' do not form a MOS transistor.

If the electrode 6G' is driven to high level, electrons move to the surface region of a semiconductor substrate SUB under the electrode 6G', thereby forming an inversion layer SS like a channel in the MOS transistor, and a additional capacitance 12 is formed as the parasitic capacitance of the inversion layer SS. By forming the inversion layer SS, a capacitance value that can be seen from the gate of an amplifier transistor 4 will be a value obtained by adding the capacitance value of the additional capacitance 12 to the capacitance value of a charge-voltage converter 3. In the third embodiment, since the additional capacitance 12 is formed by the formation of the inversion layer SS and disappears by the disappearance of the inversion layer SS, the reset of the additional capacitance 12 is unnecessary.

The second semiconductor region SR2' may be replaced by an element isolation ISO. In this case, a process of forming the second semiconductor region SR2' in the formation region of a pixel array 110 becomes unnecessary.

As an application of the solid-state image sensor according to the above-described embodiments, a camera in which the solid-state image sensor is assembled will exemplarily be described below. The concept of the camera includes not only an apparatus mainly aiming at shooting but also an apparatus (for example, a personal computer or a portable terminal) accessorily having a shooting function. The camera includes the solid-state image sensor according to the present invention exemplified as the above-described embodiments, and a processing unit which processes a signal output from the solid-state image sensor. The processing unit can include, for example, an A/D converter and a processor which processes digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-019770, filed Feb. 4, 2014, which is hereby incorporated by reference herein in its entirety.

What is claimed is:

1. A solid-state image sensor comprising:
   a photoelectric converter;
   a charge-voltage converter;
   a transfer transistor configured to transfer a charge generated in the photoelectric converter to the charge-voltage converter, wherein a potential of the charge-voltage converter changes to a first direction by a transferred charge;
   an amplifier transistor configured to output a signal corresponding to the potential of the charge-voltage converter to a column signal line, the amplifier transistor being configured to sequentially output, to the column signal line, a noise level before the transfer transistor transfers the charge to the charge-voltage converter and a light signal level after the transfer transistor transfers the charge to the charge-voltage converter;
   a capacitance between a control signal line and the charge-voltage converter; and
   a control unit configured to change a potential of the control signal line so that the potential of the charge-voltage converter changes to a second direction which is opposite to the first direction in a period in which the charge-voltage converter is in a floating state and which is prior to outputting the noise level to the column signal line,
   wherein the charge-voltage converter includes a semiconductor region, the capacitance includes a capacitance component between the semiconductor region and an electrode electrically connected to the control signal line,
   at least a part of the charge-voltage converter is formed in a semiconductor substrate,
   the electrode is arranged on an insulating layer on the semiconductor substrate,
   a second semiconductor region having the same conductivity type as that of the semiconductor region is included in the semiconductor substrate, and
   the electrode is arranged on the insulating layer on a region between the semiconductor region and the second semiconductor region.

2. The sensor according to claim 1, further comprising a second photoelectric converter, a second charge-voltage converter, and a second transfer transistor configured to transfer a charge generated in the second photoelectric converter to the second charge-voltage converter,
   wherein the capacitance includes a capacitance component between the charge-voltage converter and a gate of a transistor arranged to be able to form a current path between the charge-voltage converter and the second charge-voltage converter.

3. The sensor according to claim 2, wherein the control unit changes the potential of the control signal line to change the direction of the potential of the charge-voltage converter to the second direction, thereby transiting the transistor from off to on.

4. The sensor according to claim 1, further comprising a reset transistor configured to reset the potential of the charge-voltage converter,
   wherein the control unit changes the potential of the control signal line to change the direction of the potential of the charge-voltage converter to the second direction after the potential of the charge-voltage converter is reset by turning on the reset transistor and then the charge-voltage converter is set in the floating state by turning off the reset transistor, and in the period before the noise level is output to the column signal line.

5. A camera comprising:
a solid-state image sensor defined in claim 1; and
a processing unit configured to process a signal output from the solid-state image sensor.

6. A solid-state image sensor comprising:
a photoelectric converter;
a charge-voltage converter;
a transfer transistor configured to transfer a charge generated in the photoelectric converter to the charge-voltage converter, wherein a potential of the charge-voltage converter changes to a first direction by a transferred charge;
an amplifier transistor configured to output a signal corresponding to the potential of the charge-voltage converter to a column signal line, the amplifier transistor being configured to sequentially output, to the column signal line, a noise level before the transfer transistor transfers the charge to the charge-voltage converter and a light signal level after the transfer transistor transfers the charge to the charge-voltage converter;
a capacitance between a control signal line and the charge-voltage converter; and
a control unit configured to change a potential of the control signal line so that the potential of the charge-voltage converter changes to a second direction which is opposite to the first direction in a period in which the charge-voltage converter is in a floating state and which is prior to outputting the noise level to the column signal line,
wherein the charge-voltage converter includes a semiconductor region, the capacitance includes a capacitance component between the semiconductor region and an electrode electrically connected to the control signal line,
at least a part of the charge-voltage converter is formed in a semiconductor substrate,
the electrode is arranged on an insulating layer on the semiconductor substrate,
a second semiconductor region having a different conductivity type from that of the semiconductor region is included in the semiconductor substrate, and
the electrode is arranged on the insulating layer on a region between the semiconductor region and the second semiconductor region.

7. A camera comprising:
a solid-state image sensor defined in claim 6; and
a processing unit configured to process a signal output from the solid-state image sensor.

8. The sensor according to claim 6, further comprising a second photoelectric converter, a second charge-voltage converter, and a second transfer transistor configured to transfer a charge generated in the second photoelectric converter to the second charge-voltage converter,
wherein the capacitance includes a capacitance component between the charge-voltage converter and a gate of a transistor arranged to be able to form a current path between the charge-voltage converter and the second charge-voltage converter.

9. The sensor according to claim 8, wherein the control unit changes the potential of the control signal line to change the direction of the potential of the charge-voltage converter to the second direction, thereby transiting the transistor from off to on.

10. The sensor according to claim 6, further comprising a reset transistor configured to reset the potential of the charge-voltage converter,
wherein the control unit changes the potential of the control signal line to change the direction of the potential of the charge-voltage converter to the second direction after the potential of the charge-voltage converter is reset by turning on the reset transistor and then the charge-voltage converter is set in the floating state by turning off the reset transistor, and in the period before the noise level is output to the column signal line.

11. A solid-state image sensor comprising:
a photoelectric converter;
a charge-voltage converter;
a transfer transistor configured to transfer a charge generated in the photoelectric converter to the charge-voltage converter, wherein a potential of the charge-voltage converter changes to a first direction by a transferred charge;
an amplifier transistor configured to output a signal corresponding to the potential of the charge-voltage converter to a column signal line, the amplifier transistor being configured to sequentially output, to the column signal line, a noise level before the transfer transistor transfers the charge to the charge-voltage converter and a light signal level after the transfer transistor transfers the charge to the charge-voltage converter;
a capacitance between a control signal line and the charge-voltage converter; and
a control unit configured to change a potential of the control signal line so that the potential of the charge-voltage converter changes to a second direction which is opposite to the first direction in a period in which the charge-voltage converter is in a floating state and which is prior to outputting the noise level to the column signal line,
wherein the charge-voltage converter includes a semiconductor region, the capacitance includes a capacitance component between the semiconductor region and an electrode electrically connected to the control signal line,
at least a part of the charge-voltage converter is formed in a semiconductor substrate,
the electrode is arranged on an insulating layer on the semiconductor substrate,
an element isolation is included in the semiconductor substrate, and
the electrode is arranged on the insulating layer on a region between the semiconductor region and the element isolation.

12. A camera comprising:
a solid-state image sensor defined in claim 11; and
a processing unit configured to process a signal output from the solid-state image sensor.

13. The sensor according to claim 11, further comprising a second photoelectric converter, a second charge-voltage converter, and a second transfer transistor configured to transfer a charge generated in the second photoelectric converter to the second charge-voltage converter,
wherein the capacitance includes a capacitance component between the charge-voltage converter and a gate of a transistor arranged to be able to form a current path between the charge-voltage converter and the second charge-voltage converter.

14. The sensor according to claim 13, wherein the control unit changes the potential of the control signal line to change the direction of the potential of the charge-voltage converter to the second direction, thereby transiting the transistor from off to on.

15. The sensor according to claim 11, further comprising a reset transistor configured to reset the potential of the charge-voltage converter,
wherein the control unit changes the potential of the control signal line to change the direction of the potential of the charge-voltage converter to the second direction after the potential of the charge-voltage converter is reset by turning on the reset transistor and then the charge-voltage converter is set in the floating state by turning off the reset transistor, and in the period before the noise level is output to the column signal line.

16. A solid-state image sensor comprising:
a photoelectric converter;
a charge-voltage converter;
a transfer transistor configured to transfer a charge generated in the photoelectric converter to the charge-voltage converter, wherein a potential of the charge-voltage converter changes to a first direction by a transferred charge;
an amplifier transistor configured to output a signal corresponding to the potential of the charge-voltage converter to a column signal line, the amplifier transistor being configured to sequentially output, to the column signal line, a noise level before the transfer transistor transfers the charge to the charge-voltage converter and a light signal level after the transfer transistor transfers the charge to the charge-voltage converter;
a capacitance between a control signal line and the charge-voltage converter;
a control unit configured to change a potential of the control signal line so that the potential of the charge-voltage converter changes to a second direction which is opposite to the first direction in a period in which the charge-voltage converter is in a floating state and which is prior to outputting the noise level to the column signal line; and
an additional capacitance,
wherein the capacitance includes a capacitance component between the charge-voltage converter and a gate of a transistor arranged to be able to form a current path between the additional capacitance and the charge-voltage converter.

17. The sensor according to claim 16, wherein the control unit changes the direction of the potential of the control signal line to change the potential of the charge-voltage converter to the second direction, thereby transiting the transistor from off to on.

18. The sensor according to claim 16, further comprising a reset transistor configured to reset the potential of the charge-voltage converter,
wherein the control unit changes the potential of the control signal line to change the direction of the potential of the charge-voltage converter to the second direction after the potential of the charge-voltage converter is reset by turning on the reset transistor and then the charge-voltage converter is set in the floating state by turning off the reset transistor, and in the period before the noise level is output to the column signal line, and
the control unit resets the additional capacitance by turning on the transistor in at least a part of a period in which the reset transistor resets the potential of the charge-voltage converter.

19. The sensor according to claim 16, further comprising a reset transistor configured to reset the potential of the charge-voltage converter,
wherein the control unit changes the potential of the control signal line to change the direction of the potential of the charge-voltage converter to the second direction after the potential of the charge-voltage converter is reset by turning on the reset transistor and then the charge-voltage converter is set in the floating state by turning off the reset transistor, and in the period before the noise level is output to the column signal line.

* * * * *